United States Patent [19]

Martinsson

[11] Patent Number: 5,729,529
[45] Date of Patent: Mar. 17, 1998

[54] TIMING AND SYNCHRONIZATION TECHNIQUE FOR ATM SYSTEM

[75] Inventor: Lars Olle Martinsson, Vanersborg, Sweden

[73] Assignee: Telefonaktiebolaget LM Ericsson (publ.), Stockholm, Sweden

[21] Appl. No.: 581,325

[22] Filed: Dec. 29, 1995

[30] Foreign Application Priority Data

Jul. 6, 1995 [SE] Sweden ................. 9502468-3

[51] Int. Cl.$^6$ .................................... H04L 12/56
[52] U.S. Cl. .................. 370/235; 370/397; 370/399
[58] Field of Search ....................... 370/230, 235, 370/389, 391, 392, 395, 397, 399, 409, 419, 471, 474, 503, 514; 395/200.02, 200.06, 200.2, 250

[56] References Cited

U.S. PATENT DOCUMENTS

| | | | |
|---|---|---|---|
| 4,646,329 | 2/1987 | Bojarski | 375/116 |
| 4,773,084 | 9/1988 | Scholz | 375/111 |
| 4,930,125 | 5/1990 | Bains | 370/105 |
| 5,193,088 | 3/1993 | Choi et al. | 370/60 |
| 5,285,441 | 2/1994 | Bansal et al. | 370/16 |
| 5,331,641 | 7/1994 | Parruck et al. | 370/102 |
| 5,381,411 | 1/1995 | Ohmo et al. | 370/474 |
| 5,408,463 | 4/1995 | Merchant et al. | 370/16 |
| 5,412,655 | 5/1995 | Yamada et al. | 370/474 |
| 5,541,926 | 7/1996 | Saito et al. | 370/474 |
| 5,570,368 | 10/1996 | Murakami et al. | 370/395 |
| 5,602,853 | 2/1997 | Ben-Michael et al. | 370/474 |
| 5,610,921 | 3/1997 | Christensen | 370/395 |

FOREIGN PATENT DOCUMENTS 43 16 225 A1 11/1994 Germany.

OTHER PUBLICATIONS

Fabrice Guillemin, Pierre Boyer & Luc Romoeuf, *The Space Controller: Architecture and First Assessments*, C-4 Broadband Communications (Proceedings of the IFIT TC6 Workshop on Broadband Communications, Estoril, Portugal) Transactions C(Communications Systems) 313–323 (Jan. 20–22, 1992) (Document No. XP 000430627), Jan. 20, 1992.

H. Jonathan Chao & Necdet Uzun, *A VLSI Sequencer Chip for ATM Traffic Shaper and Queue Manager*, 27 IEEE Journal of Solid State Circuits 1634–1643 (Nov. 1992) (Document No. XP 000320793), Nov. 1992.

*Primary Examiner*—Hassan Kizou
*Attorney, Agent, or Firm*—Jenkens & Gilchrist, P.C.

[57] ABSTRACT

A system and method for regulating cell transfer timing and for reestablishing resynchronization in a packet switched telecommunications system is described. One or more marker cells, called Empty Cell Position (ECP) patterns, are placed between and amongst a sequence of data cells. Each ECP pattern comprises a bit sequence that is readily distinguishable from a data cell but having the ability to substitute for a standard data cell in an outgoing transmission time slot. This permits control of the relative transmission times of each data cell of the sequence. The data cells and ECP patterns are placed in an elastic buffer such as a FIFO to permit cell generation to be made relatively independent of cell transmission. This method and system additionally permits a cell transmitter to reestablish synchronization every time it detects an ECP pattern. Different ECP patterns can be used to represent varying inter-cell intervals. A cell generator places data cells and ECP patterns in a buffer. A cell transmitter retrieves the data cells and ECP patterns from the buffer and transmits the data cells after a time delay that depends on the number and contents of the ECP patterns immediately preceding that data cell.

38 Claims, 7 Drawing Sheets

TIMING AND SYNCHRONIZATION TECHNIQUE FOR ATM SYSTEM

CROSS REFERENCES TO RELATED APPLICATIONS

This Nonprovisional U.S. patent application contains subject matter related to, and claims priority in part from, Swedish Patent Application Serial Number 95-02468-3, entitled "ATM Throttling" filed on Jul. 6, 1995 and PCT Patent Application Serial Number SE-96000887, entitled "ATM Throttling" filed on Jul. 5, 1996. The above-identified related Nonprovisional U.S. patent application and the prior Swedish Patent Application and the disclosures contained therein are hereby incorporated by reference herein.

DESCRIPTION

1. Technical Field of the Invention

The present invention relates to asynchronous transfer mode (ATM) data transfer and, more particularly, to a system and method for incorporating cell transfer timing and data resynchronization within such a system.

2. Description of Related Art

With the increased demand for communication resources taking place worldwide, operators of telecommunications networks have sought to employ a single flexible technology to handle the transport and switching of various types of telecommunication services within their infrastructures. One such technology is asynchronous transfer mode (ATM).

ATM is currently being implemented in an attempt to satisfy increasing communications needs by creating a bearer telecommunications network which has substantially "bandwidth granularity" and which is capable of coping with very high bandwidth connections. The term "bandwidth granularity" refers to a characteristic of the network in which the bandwidth required by a call can vary freely throughout the duration of that call.

The use of ATM technology in both public and private telecommunications networks provides the capability of common switching and transport for related services, increased bandwidth granularity, support of variable-bit-rate services, and support of multimedia services. Because of these features, ATM has been chosen by the International Telecommunications Union (ITU) as the core technology for broadband ISDN (B-ISDN) services.

The use of an uniform ATM cell structure is at the heart of ATM technology implementation. In one embodiment, an ATM cell has a fixed length of fifty-three bytes, or octets, divided into a five-octet header and a forty-eight-octet information field (also known as the "payload"). The ATM cell header is structured as a number of fields and one of its principal functions is to assist in the routing of an ATM cell from its point of origin to its point of destination through one or more ATM switching nodes.

The ATM cell header also contains, in the fifth octet thereof, error detection information in the form of cyclic redundancy check (CRC) bits. The CRC information is used to determine whether or not any errors have occurred during the transmission of the ATM cell header from one point to another and thus, whether the information within the cell header has been accurately received at its destination.

It should be noted that the ATM standard that has been adopted by the ITU does not presently embody either error correction of the header segment or even error detection of the payload segment in the interests of simplifying the transmission protocols, the present standard embodies only error detection and not error correction. Further, the error detection is limited to the header segment and does not include the payload segment of an ATM cell.

This trade-off shows that the present standard is focused on preventing the misdelivery of ATM cells through the corruption of envelopes (i.e. the ATM cell headers) than on preventing the mistransmission of messages through the corruption of the contents (i.e. the ATM cell payload). The detection and/or correction of message corruption has been left to higher levels of the protocol.

The information contained in each ATM cell is kept relatively small in order to keep the data packaging/disassembly time within a range that is compatible with low-bandwidth telephony applications where the transmission latency needs to be minimized (e.g., voice links). If the size of the standard ATM cell header were to be increased, then the delay arising from the time needed to assemble a slow stream of data into a standard sized package would be unacceptably high. Conversely, if cells were transmitted before they were full, then the utilization rate of the available bandwidth would be unacceptably low.

Another reason for keeping the size of a standard ATM cell low is to have the fine granularity needed to send variable-length data messages. Since data is commonly stored in multiples of eight bits, the size of the payload segment of an ATM cell needs to be a multiple of this size. If the multiple were to be too small, then the transmission overhead would be very high because the header would be large in comparison to the payload. If on the other hand, the multiple were to be too large, then there would be low bandwidth utilization because the final ATM cell of each data message is likely to be only partially filled. Additional reasons for keeping the size of an ATM cell low include the need to reduce the size of the internal buffers in the switching nodes and to limit the queuing delays in those buffers.

The principal function of the ATM cell header is the identification of the virtual connection. Routing information carried by the ATM cell is contained within two fields: a virtual path identifier (VPI), which determines which virtual path the ATM cell belongs to, and a virtual channel identifier (VCI), which determines which virtual channel within a virtual path the ATM cell belongs to.

A virtual channel is a dynamically allocable end-to-end connection. Optical transmission links are capable of transporting hundreds of megabits per second, whereas virtual channels may fill only a few kilobits per second of a link. Thus, a large number of simultaneous virtual channels can be supported on a single transmission link.

A virtual path, on the other hand, is a semi-permanent connection between end points. Each of the virtual paths can transport a large number of simultaneously-connected virtual channels. Since a large group of virtual channels are handled and switched together as a single unit, the total processing requirements of a virtual path are less than that of a virtual circuit, consequently there is faster processing per (virtual) circuit, resulting in a significantly more efficient use of network resources. The network management of virtual paths is relatively simple and efficient.

In the transmission of data within an ATM network, each logical connection is assigned a predetermined transmission rate. The assigned transmission rate is determined by either the transmitter or the receiver of the data transmission. Each connection's transmission rate is a fraction of the total inter-node network transmission capacity with increased transmission rates resulting in greater costs to the user of the connection. Thus, limiting and maintaining cell transmission rates from a data source within the network is an important operational requirement.

For example, data cells muse not be generated and transmitted into the network at a rate greater than a predetermined allowable value based upon agreements with the network operator. Similarly, it is difficult to regulate transmission rates within nodes within the network where the transmission rates of the different logical connections may become unbalanced as may happen when cells may pass through different paths and that the buffers may become full and some cells discarded, etc. Thus, the timing between transfer of successive cells both into and within a network is an important issue in ATM cell generation and transmission systems.

Another important issue in ATM transmission systems is that of cell alignment within the various data buffers and the receiving and transmitting modules. For example, when a data buffer first begins receiving a sequence of ATM cells it knows because of the regularity of the cell structure where each cell begins and ends. However, in the event of a data error or a power outage or some perturbation in the system, it may lose track of the location of the particular bit at which one cell ends and another begins within a continuous stream of data flowing through the buffer.

The principal way in which cell alignment has been reestablished in the past has been by continuing to look at blocks of data equivalent to a cell header and checking for CRC correspondence with the fifth octet thereof. If a negative CRC calculation ms obtained, it is concluded that the block of data tested was not the fifth octet of a cell header and the data is shifted one bit position within the buffer and another attempt at CRC correspondence calculation is made. This procedure is followed until the CRC correspondence calculation proves successful in identifying an ATM cell header segment. Once a CRC correspondence occurs, a possible cell header has been found. The data block corresponding in position to the fifth octet of the header of the next cell following is checked and so forth. When seven successive CRC positives are obtained for seven successive cell headers, the system concludes that cell alignment has been reestablished.

Needless to say, such a technique for reestablishing cell alignment once it is lost is relatively inefficient. A related system is shown in U.S. Pat. No. 5,193,088. This CRC calculation technique for realignment is difficult to perform because one ATM cell is virtually indistinguishable from another. Even blank or idle cells contain a header followed by a default format of data comprising the payload.

Another technique for the resynchronization of a system with a stream of ATM cells flowing through a buffer is to allow the data buffer to become empty which would, of course, allow resynchronization with the next group of cells coming into the buffer. However, allowing a cell buffer to become empty creates an even more difficult problem since the receiving computer would lose timing information about the ATM cells as it could not determine the time period for which the data buffer had been empty when a new cell arrives. Consequently, letting an ATM cell buffer go empty would require some time supervision and protocol overhead to ensure proper operation.

The system of the present invention incorporates an improved technique for controlling the timing of the transmission of ATM data cells at various selectable data rates and at the same time providing for the reestablishment of ATM cell alignment in the event misalignment occurs. The system may be used within a module which is generating and transferring data cells into an ATM network or for the transfer of cells between two separate modules outside a network.

SUMMARY OF THE INVENTION

The system and method of the present invention relates to a technique for regulating the rate of transmission of data cells in a telecommunications environment. The regulation is performed by generating and placing marker cells called Empty Cell Position (ECP) patterns between and amongst a sequence of ATM cells. Each ECP pattern comprises a bit sequence that is readily distinguishable from an ATM cell but which can occupy a transmission time slot of the same size as that needed by a standard ATM cell. This permits control of the relative transmission times of each of a sequence of sequentially ordered ATM cells.

In one aspect the system and method of the present invention includes the generation or processing of a sequence of data cells having a fixed format for transmission at various times and at various data rates. Each data cell has a data portion and an associated timing tag that is indicative of the time at which the data cell is to be transmitted relative to the time of transmission of the immediately preceding data cell. Each data cell is stored in a first-in-first-out (FIFO) buffer register.

An empty cell position (ECP) pattern is generated which contains information indicative of an user-selectable delay time for the transmission of the next data cell, the structure of the ECP word being distinguishably different from the structure of the data cells. Zero or more ECP patterns are stored in the buffer after each data cell with the number and contents of the ECP words corresponding to the desired time delay before the transmission of the next data cell in the buffer. Data is read from the output of the buffer. Each data cell emerging from the buffer is transmitted after a time delay that is determined by the number and contents of the ECP patterns preceding that data cell.

BRIEF DESCRIPTION OF THE DRAWINGS

A more complete understanding of the method and system of the present invention may be obtained by reference to the following Detailed Description of the preferred embodiment (s) that follow, taken in conjunction with the accompanying drawings, wherein.

DESCRIPTION OF THE PREFERRED EMBODIMENT

The system of the present invention may be used in the transfer of ATM data cells between discrete modules or within a data network within which ATM data are transmitted from one node to another. As set forth briefly above, one embodiment of a standard ATM cell contains 53 octets or bytes of digital data. An ATM data packet may comprise and extend over several successive cells. A data call message or data file is generally transmitted through the ATM network as one data packet and will thus always comprise a sequence of several successive data cells and frequently a very large number of cells. However, in the following description, only individual cells will be considered.

Figure 1:
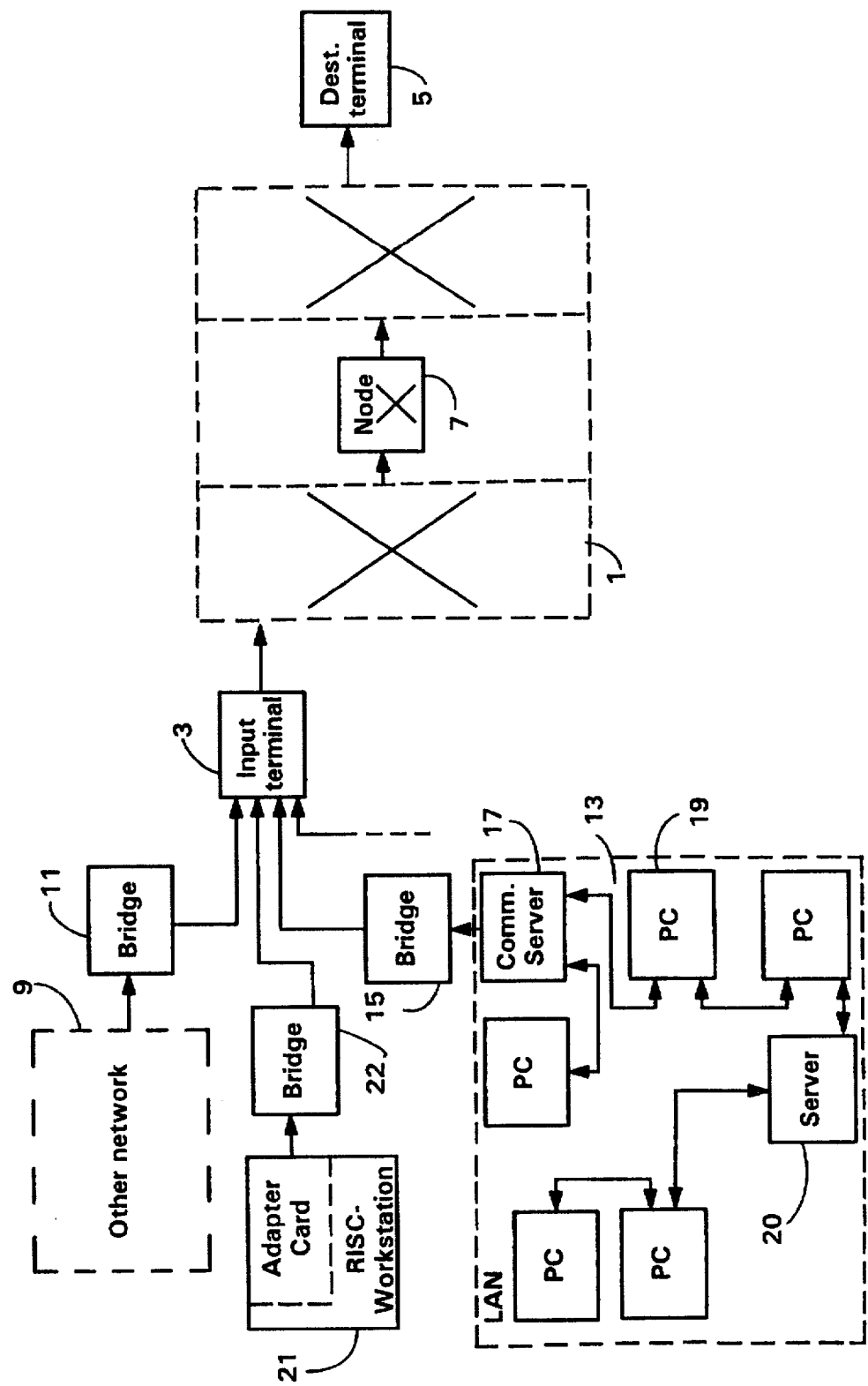
FIG. 1 is a block diagram schematically illustrating an ATM network.

Referring first to FIG. 1, there is shown an ATM data network 1 intended for the transfer of data packets from an input data terminal 3 to an output or destination data terminal 5. The terminals 3 and 5 may comprise both transmitters and receivers of data packets and may be connected to the network 1 in any number. In FIG. 1, only one direction of transmission is illustrated and that is between one input terminal and one output terminal. The ATM network 1 generally comprises a plurality of intermediate switching nodes only one of which is illustrated at 7. Switching unit 7 is connected to other similar switching nodes not shown).

When the terminal station 3 is ready to begin the issuance of data packets into the network toward the destination terminal 5, a signal indicative thereof is sent to a switching node within the network. This message also contains information requesting the specification of a transmission data rate for the cells to be transmitted.

Thereafter, a logical signal path is set up through the network and various messages and control information are exchanged between the different switching nodes 7 in the network 1. When a connection path has been set up, an appropriate message is transmitted from the network 1 to the terminal 3 that connection is now established and ready to be used for the transfer of data packets at the assigned rate from the input station 3 towards the destination station 5.

The input or source terminal 3 also receives messages or calls from other sources: for example, from another network 9 through a data bridge 11 and from a local area computer network (LAN) 13 through a bridge 15 connected to a communications computer or file server 17 within the LAN 13. LAN 13 interconnects a plurality of personal computers or workstations 19 to a file server 20, and is controlled by networking software well known in the industry. A high-speed Reduced Instruction Set Computing (RISC) workstation 21 can also be connected to the input terminal 3 using a suitable workstation adapter and a bridge 22. The input terminal 3 may itself be an integrated part of a communication device, for example, an accessory board mounted in a dedicated communications server.

A certain sequence of discrete operations must be performed within the input terminal 3 in order to transmit cells from different logical connections at discrete data rates which have been established for each connection. Of course, a source of data communicated into a network normally wants the data to be transferred to the destination as fast as possible.

However, the cost of data transfer may be different for the various transmission rates available through the network. In addition, the circuits and/or data storage devices of the destination terminal may not have the ability to receive data at every rate provided for in a telecommunications standard. Thus, there is a need for a mechanism for controlling the issuance of data into the network at the highest possible rate for a particular user's needs, for different terminal capabilities and for the various and different logical connections which may be set up through the network.

In addition, certain types of data sources may desire to have its data transferred through the network at a constant bit rate, for example, in the case of devices issuing real time data such as video data from a video teleconference or other moving images.

One solution to the data rate problem is to allot a maximum data rate which is equal to or slightly greater than that which would be required by the source if there was a direct data path through the network from one end to the other, i.e., if the path did not pass through intervening switching nodes and was not subject to interruptions in transmission by other data traffic through the network. Another solution would be to configure the network so that certain channels would pass the information directly through the network without interruption. However, this type of arrangement increases the complexity of the system.

in the transmission of data cells from the input terminal 3 into the network, the time for transmission is considered to be divided into a plurality of uniform time slots (TSs). During each TS interval either one cell or no cell is transmitted from the terminal. The typical time between the beginnings of two successive time slots would then correspond in order of magnitude to the maximum output rate of the data link being used for transmission. For a transmission rate of approximately 10 megabits per second and an ATM cell size of fifty-three octets, a single time slot increment is 42.4 microseconds. For a transmission rate of 155.52 megabits per second, the time slot period is equal to 2.73 microseconds.

A maximum transmission rate is defined for each logical connection within the network. The inverse of the maximum transmission rate corresponds to the minimum distance between time slots (MDTS). The MDTS can be expressed in multiples of the minimum inter-cell time interval i.e. the least possible time between successive cells passing through the network. If a transmission rate is assumed to be 10 megabits per second with a minimum time slot value of 42.4 microseconds, then an unit MDTS is the equivalent of the maximum output rate, i.e., a cell transmission time of 42.4 microseconds.

This means that when a logical connection is being fully utilized and is sending data at the design maximum rate, one cell would be transmitted in each time slot and, during this time period, no cells from other queues within the network could be transmitted. An MDTS of two represents half the maximum output rate (i.e., 5 megabits per second); an MDTS of 3 is a third of the maximum output rate (i.e., 3.3 megabits per second), and so on.

The same processing of data within the input terminal 3 may also be executed in an internal node 7 of the network 1 since a modification of the data cell transfer rate may be needed within the network as well in order to balance the data flow through the network. For example, some nodes within the network may sometimes become inactive, data cells may be lost, there may be differing capacities of the internal buffers located within the various nodes, etc. Buffering is necessary to make it possible for the network to handle the fluctuations in the cell flow rate that inevitably arise from the multiplexing of data traffic from multiple independent sources.

Figure 2:
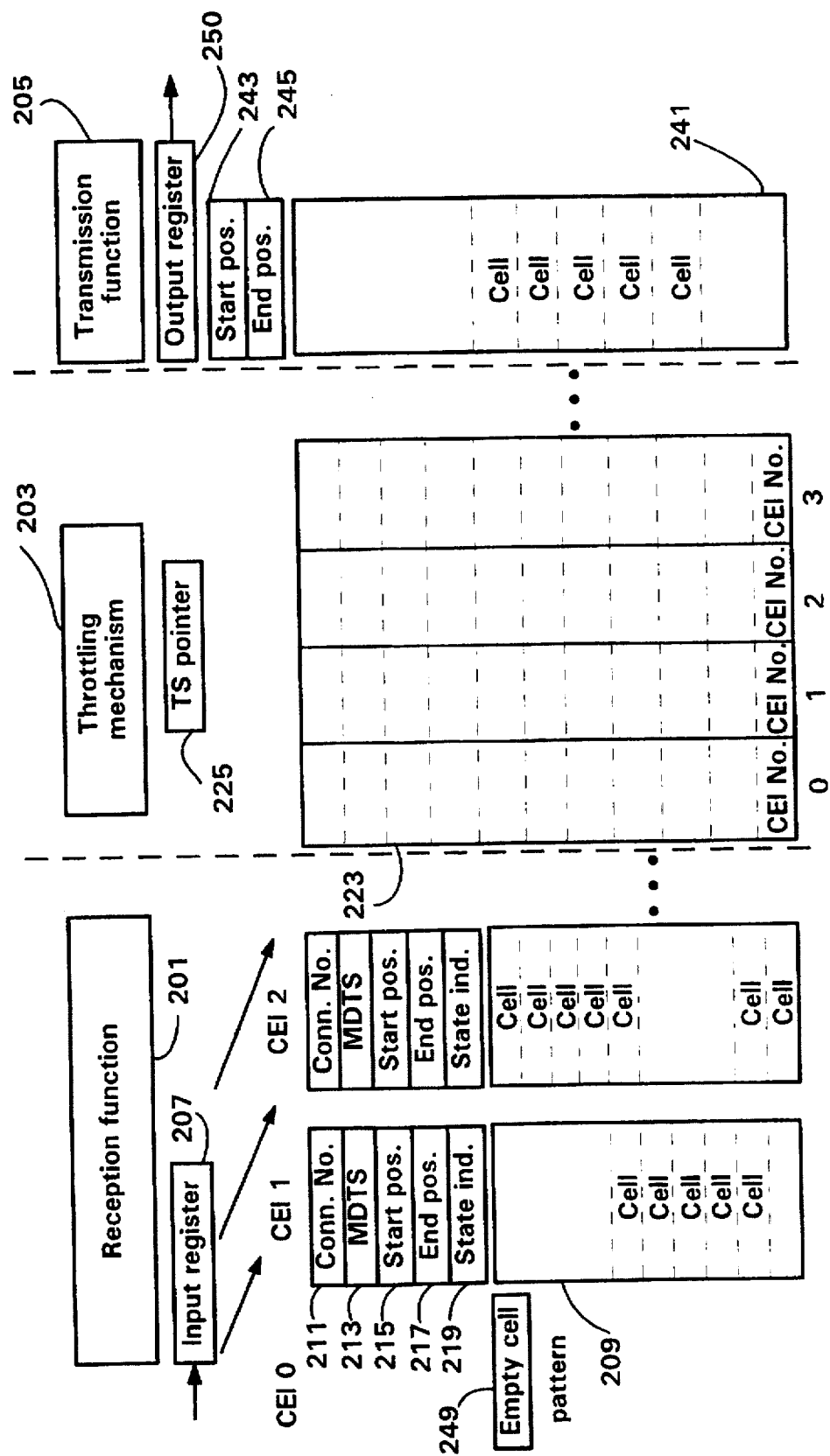
FIG. 2 is a block diagram of an illustrative terminal which may be used within the ATM network of FIG. 1.

The sequence of processing steps required to control the data transfer rate within either an input terminal 3, or an intermediate node 7, are illustrated in the block diagram of FIG. 2. There, a reception function 201 administers messages, files, data packets and cells which are respectively arriving at the terminal by segmenting or dividing the arriving data into suitable segments such as standard ATM cells. The reception function 201 manages the storage of the cells in cell queues with each logical connection having a connection identifier (CEI). Each CEI identifies a certain queue of cells associated with a single destination terminal for those cells.

The reception function 201 illustrated in FIG. 2, handles the segmenting of data arriving at the input terminal 3 and the storing of cells obtained from the data in queues arranged in accordance with logical destination connections. As illustrated in FIG. 2, data arriving at the input register 207 are stored in reception registers or input buffers 209. One buffer 209 is established for each currently active or open logical connection. The buffer for each such logical connection is referred to as a CEI queue. The CEI queues are serially numbered "CEI No. 0", "CEI No. 1", etc. Registers or storage cells are provided for each such CEI queue for holding the data necessary for administration of the buffers. The buffers are preferably cyclically organized.

Thus, the connection number of the cells in the buffer is stored in a register 211; the rate selector MDTS of the connection is stored in a register 213; a pointer to the stored cell in the buffer is stored in the field 215; and a pointer to the next position in the buffer where a new cell can be stored is stored in register 217. In a field 219, an indicator for active state is stored to designate whether or not the queue is active; that is, whether the queue participates in the throttling process. The cells which are stored in the buffer 209 have not yet been transmitted from the station or node and a cell which is physically sent by the transmission function 205 is, accordingly in one embodiment of the system, always removed from its CEI buffer 209.

As illustrated in FIG. 2, the terminal also includes a throttling process 203 which regulates the transmission function of the cell generator 205 and controls which cells will be transmitted so that cells are sent at a predetermined desired rate. This is done by supplying a list of output connection identifiers (CEIs) to the transmission function 205. Thus, it is not necessary that the throttling process 203 exactly define which cell to transmit, but may only give the queue numbers or, equivalently, the logical connections in a correct sequential order so that the transmission function takes the next connection number from the list and transmits the next cell in the queue destined for this particular connection. The basic procedure performed in the reception function 201 is illustrated by the flow diagram of FIG. 3.

Figure 3:
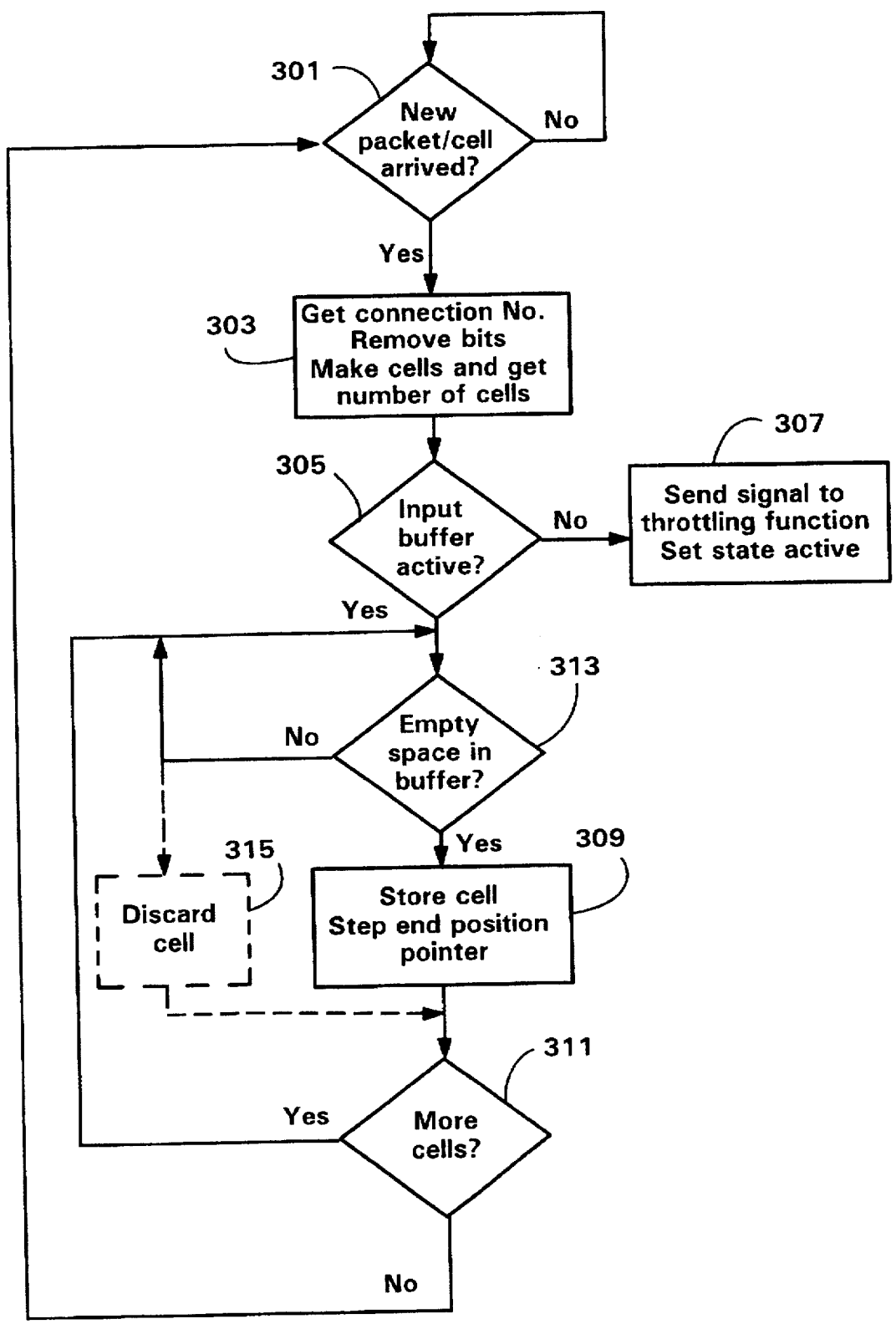
FIG. 3 is a flow chart illustrating the sequence of steps performed by the reception function of the terminal illustrated in FIG. 2.

Referring now to FIG. 3, when it is decided at 301 that a new data packet/cell has arrived and should be processed, this new information is processed at 303 to assign a logical connection number to the incoming data. For example, a logical connection number, or equivalent information, pointing to a logical connection can be retrieved directly from the incoming data according to the protocol being used. Such information may also be contained within the header portion of a standard ATM cell. Thereafter, some bits in the header or, in some cases in the entire header itself, of a data packet or cell can be removed from the rest of the cell. In addition, the number of ATM cells to be generated from a received data packet or message is also calculated.

Next, it is determined at 305 whether the input buffer for the logical connection to the information is already active or not; that is, whether it is participating in the throttling process and thus present in a TS queue. This step is performed by testing the indicator stored in the memory field 219 (shown in FIG. 2) for active state. If the indicator is inactive, then at 307, a signal is sent to the throttling function 203 informing it that the queue under consideration has now become active and that the state indicator in field 221 should be changed to indicate that active condition.

Next, at 309, a cell is stored within its associated buffer 209 (shown in FIG. 2) at the position specified by the end position pointers stored in field 217 and the end position pointer is incremented by one unit. Thereafter, it is determined at 311 whether or not there are more cells to be stored and, if not, the procedure loops back to the start block 301. If, however, it is determined at 311 that there is another cell to be stored, the system moves to 313 where it is determined whether or not there is space in the buffer under consideration for the storage of an additional cell.

This process is performed by comparing the start and end position pointers stored in the fields 215 and 217 (FIG. 2), respectively. If those values are equal, then the buffer is full and the procedure must wait until there is an empty space in the buffer by looping repeatedly through the decision block 313. Alternatively, the cell for which there is no space in the buffer, may be discarded as suggested at 315. When buffer space is found, execution of the process continues from 309.

In the throttling of ATM cells moving through a terminal of the type represented by FIG. 2, the system of the present invention advantageously provides for the generation and use of special empty cell position (ECP) data patterns. For example, the ATM cell generating function within the terminal 3 can be performed by either hardware or software elements. Such a function generates each data cell in accordance with a preselected pattern and thereafter controls the sequence and timing of all data cell transmissions from the terminal.

However, some cells may not lend themselves to generation in real time, for example, due to different levels of complexity within the data comprising the cells; due to dependence on access to some common resource not available in real time; or, in the case of software-implemented cell generation, due to other tasks within a multitasking environment which require real time service by the software.

Because of these factors, it is highly desirable to include a cell buffer function that is connected to the cell transmitter. Such functions are typically implemented in hardware, however, such implementations only require relatively simple functionality in each of the cell generator, the cell buffer, and the cell transmitter.

Figure 4:
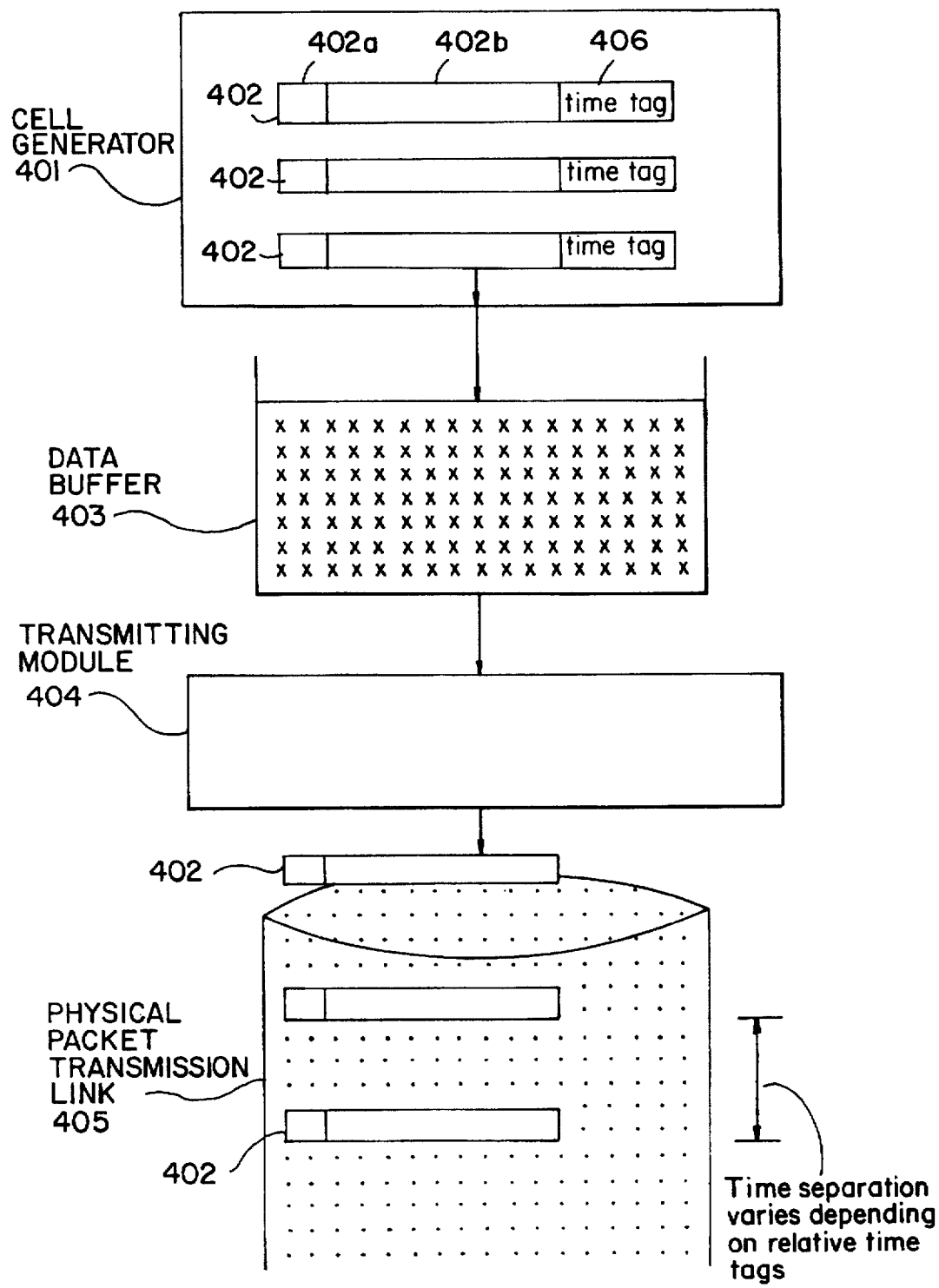
FIG. 4 is a block diagram illustrating a terminal within which ATM cells may be generated and transferred along with timing information into an ATM network in accordance with the principles of the invention.

Referring next to FIG. 4, there is shown an illustrative diagram of a system constructed in accordance with the principles of the present invention for generating ATM cells and moving those cells into an ATM network through a physical link. The cell generator 401 produces or retransmits ATM cells 402 each of which includes a header 402a and a payload 402b. The cell generator also associates each ATM cell with a time tag 406. The time tag 406 defines the relative time within which the respective ATM cell with which it is associated is to be transmitted into the network with respect to the adjacent cells which are contiguous in time.

The cell generator 401 delivers the ATM cells into a data buffer 403 illustratively shown as a first-in-first-out (FIFO) register. The output of the buffer 403 delivers the ATM cells to a transmitting module 404 which, in turn, moves each successive cell into a physical ATM link 405. Each of the cells 402 are transmitted along the ATM physical link spaced from one another by appropriate time period determined by their relative time tags, generated and appended by the cell generator 401.

The cell generator 401 may be implemented within the software of a processor. Such software generates data cells and defines the relative time for eventual transmission of each cell with respect to the contiguously adjacent cells produced by the cell generator. The processor within which the cell generation software is running is coupled by means of a hardware interface to the buffer 403 which is, in turn, linked to the transmitting module 404 and which comprises a hardware module connected to the physical link 405 of the ATM network.

Figure 5:
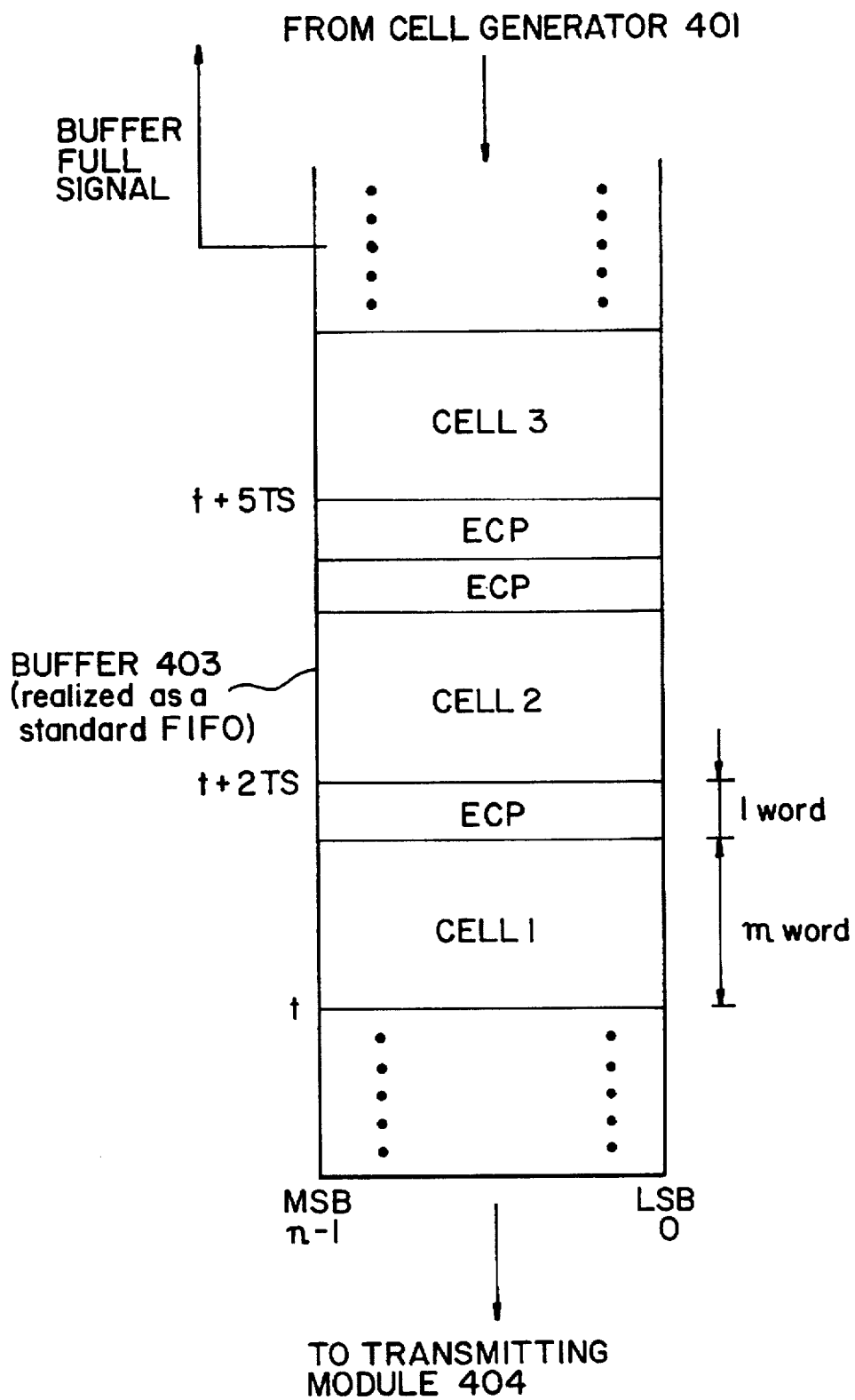
FIG. 5 is an illustrative diagram of the organization of the data buffer depicted in the block diagram of FIG. 4.

Referring next to FIG. 5, there is shown an illustrative diagram of the data buffer 403 illustrated in FIG. 4. In one embodiment of the present invention, data buffer 403 is a standard FIFO register circuit n bits in width. Each ATM cell will occupy m number of words within the storage registers of the buffer 403. The parameters m and n are correlated to the size of the ATM data cells so that the product of m and n equals the number of bits per ATM cell.

For example, with a standard ATM cell comprising fifty-three octets of data, the register width is typically chosen to be thirty-two bits wide (i.e., n=32) and the register depth is typically thirteen words per ATM cell (i.e., m=13). It should be noted that the eight CRC bits of an ATM cell header are usually set aside during the internal processing of an ATM cell. The first word of each cell in the buffer usually contains all or part of the ATM cell header. The patterns of each header of each cell are generally different from one another and dependent for their value upon the particular logical ATM connection for which they are destined.

The timing defined by the time tags associated with each ATM cell produced by the cell generator 401 establishes the generation and transfer into the buffer of a number of empty cell position (ECP) patterns positioned between the adjacent cells stored in the buffer. Each ECP pattern is preferably constructed so that it is one word in length and the pattern is chosen so that the same pattern never occurs in the first word of any of the data carrying ATM cells stored in the buffer, i.e. an ECP pattern is uniquely identifiable from a data cell. For example, if the length of each word is chosen to be thirty-two bits (i.e., n=32), and so-called idle cells (i.e., cells having VPI and VCI values of zero) are never generated, then the binary bit pattern 00000000 00000000 00000000 00000000 could be selected as the ECP pattern to be used.

The number of ECP patterns located between any two consecutive ATM cells within the buffer can consist of any number greater than or equal to zero. If it is assumed that the time represented by each ATM cell or ECP corresponds to that of a single time slot (TS), then the time interval between any two contiguous cells is the duration of each time slot multiplied by one more than the number of ECPs. By means of this calculation it is possible for the cell generator to precisely specify the time (within the unit time resolution, TS) for transmission of each of the ATM cells into the network. For the example illustrated in FIG. 5, if cell 1 is transmitted at time t, then cell 2 will be transmitted at time (t+2xTS) and cell 3 will be transmitted at time (t+5xTS).

In one embodiment of the present invention, the buffer 403 generates and sends a signal back to the cell generator 402 to indicate when the buffer is full. Such a full signal may be generated in response to a physical capacity limit being reached within the buffer and which is activated when the empty space remaining in the buffer corresponds to less than the length of one ATM cell.

However, the latency time for the cell transmission from the buffer is not directly defined by the physical fill level of the buffer. Instead, the latency time is governed by the current number of cells plus the number of ECPs in the buffer. Thus, for a system that is sensitive to latency time, the buffer full signal could instead be generated by some threshold function connected to a counter that counts the current number of cells plus ECPs in the buffer. It is unnecessary for the transmitting module 404 to receive an empty signal from the buffer, for example, if the cell generator guarantees that the buffer will never become completely empty.

Figure 6:
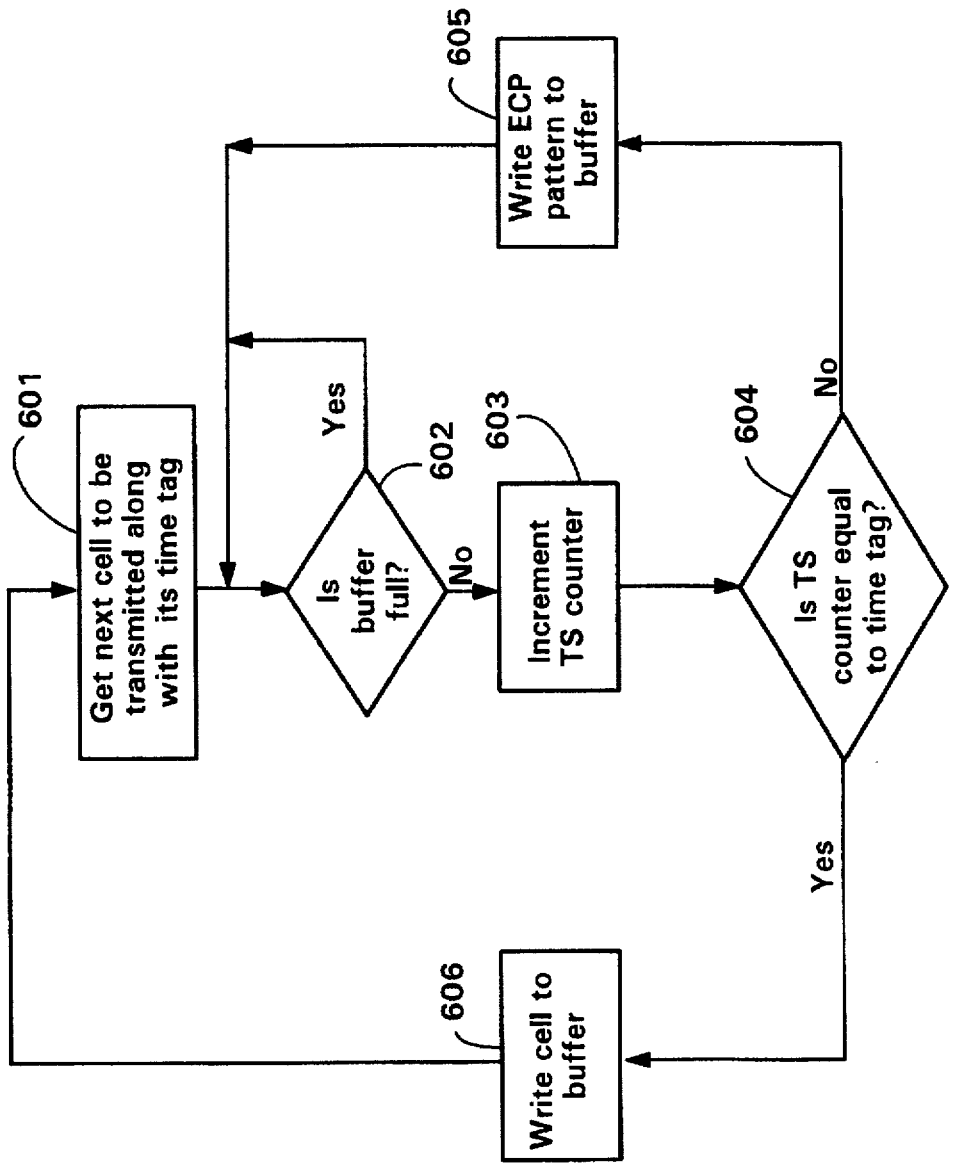
FIG. 6 is a flow chart illustrating the process steps performed by the cell generator illustrated in FIG. 4.

FIG. 6 shows a flow chart for part of the cell generator 401 shown in FIG. 4. Here it is assumed that the cell generator 401 contains a TS counter whose value corresponds to the real time of the cell transmission.

Referring to FIG. 6, at 601, the system obtains the next cell for transmission along with its time tag and moves to 602 where it inquires whether or not the buffer is full. If so, it simply loops at 602 and waits until it can move to 603 at which it increments the time slot counter by one and moves to 604 where it checks to see if the time slot counter is equal to the time tag. If the answer to this question is in the negative, the system writes an ECP pattern to the buffer at 605 and jumps to 602. If, at 604, the time slot counter is determined to be equal to the time tag associated with the next ATM cell, the system writes the ATM cell into the buffer at 606 and returns to 601 for processing the next ATM cell.

Figure 7:
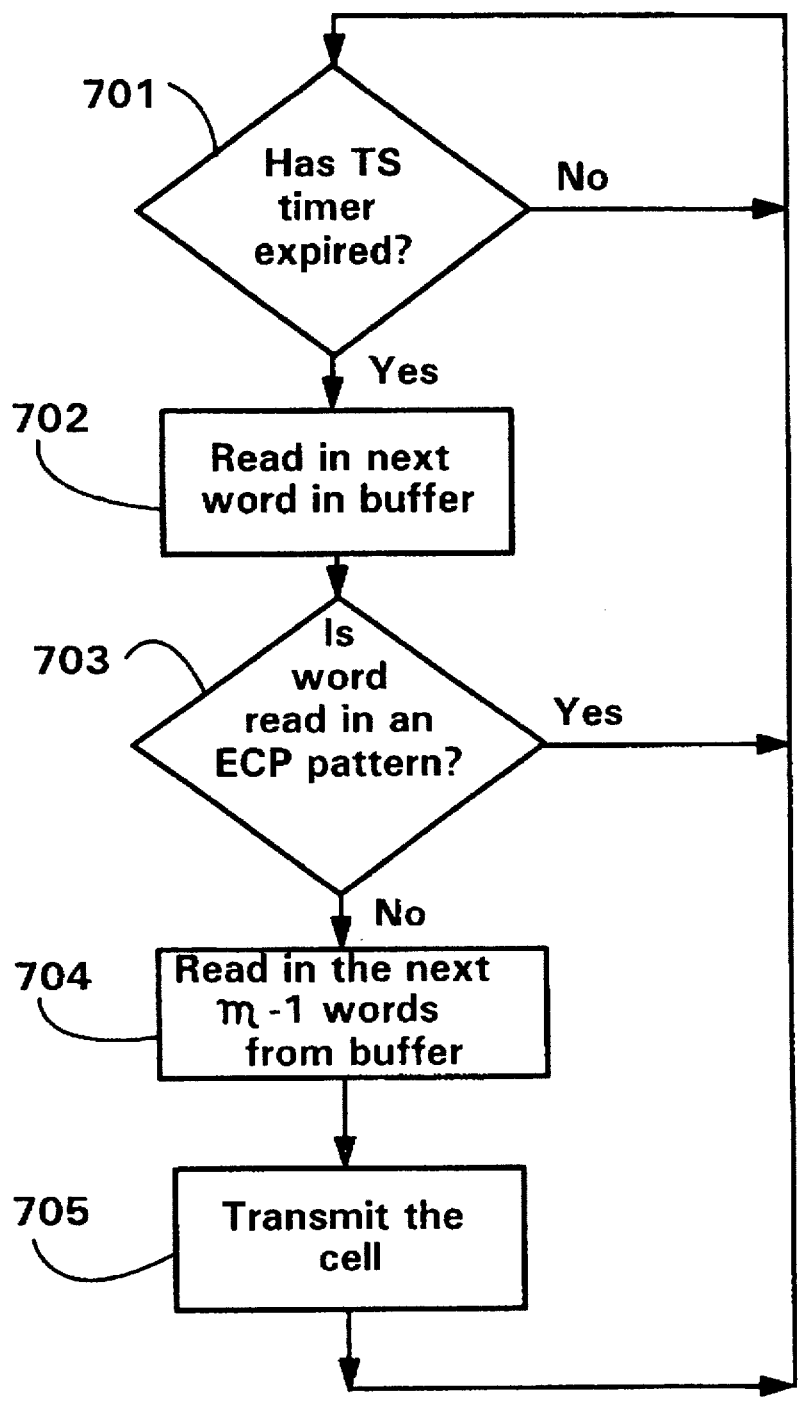
FIG. 7 is a flow chart illustrating the process steps performed in the transmitting module of the terminal of FIG. 4.

Referring now to FIG. 7, there is shown a flow chart for the operation of the transmitting module 404 illustrated in FIG. 4. In this process it is assumed that there exists a timer that defines when one time slot has elapsed. At 701 the system inquires whether or not the time slot timer has expired. If not, the system waits. If so, however, the system moves to 702 at which it reads the next word in the buffer and evaluates at 703 whether or not the word is an ECP pattern. If so, it cycles back to 701. If, however, at 703 it is determined that the word read is not an ECP pattern, and is thus a portion of an ATM cell, the system reads the following m−1 words at 704 and then transmits the cell into the physical link of the ATM network at 705. Thereafter, the system cycles back to 701.

The inherent cell alignment function achieved by the system of the present invention is illustrated by the operation of the transmitting function illustrated in FIG. 7. That is, in the event the transmitting function loses cell alignment, sooner or later it comes across a true ECP pattern and, at that point, ATM cell synchronization is immediately reestablished. In any case, cell realignment can be achieved following m−1 ECP patterns in a row located within the registers of the buffer.

The system of the present invention can also be used for transferring cells between two data modules via a buffer in order to achieve cell alignment in that process, i.e. when cell timing features are not used at all.

Of course, another way of achieving cell alignment when cell timing is not of interest would be to allow the buffer to run empty and to use buffer fill level flags to indicate when the buffer is empty or has less than one cell remaining. However, such a method is unavailable when buffer fill level flags are not available for the module that reads from the buffer.

The system of the present invention is particularly useful in the case where the source for ATM cells being generated is a computer and that computer cannot itself provide the physical link connected to the ATM network and requires some interface between the two. In using the process of the present invention, the cell generator computer controls the timing for each cell and accurately regulates data transmission speed while at the same time allowing ready realignment of cells for the device which is receiving those cells from the buffer. The goal within a cell generator is that of providing an adequate supply of ATM cells within a system employing a multi-processing or multi-tasking environment.

The system of the present invention can also be used to transfer ATM cells either between two physical or logical modules or within the components of an ATM network. The present system is used to transfer timing information regarding the respective timing distance between adjacent ATM cells while at the same time providing an inherent cell alignment function which facilitates recoupment of lost cell alignment between two modules and which will automatically be reestablished after a certain period of time.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as see forth and defined by the following claims.

What is claimed is:

1. In an Asynchronous Transfer Mode (ATM) telecommunications network, a method for regulating the time of transmission of ATM cells over several virtual connections operating at various data rates, said method comprising the steps of:

generating an extended ATM cell by relating each ATM cell to be transmitted to a timing tag, each ATM cell having a data portion and a header portion, said timing tag being indicative of the time at which the ATM cell is to be transmitted relative to the time of transmission of the immediately preceding ATM cell;

storing each ATM cell in a sequentially-accessible buffer;

generating an empty cell position (ECP) pattern containing information indicative of a user-selectable delay time for the transmission of the next ATM cell;

storing zero or more ECP patterns in said buffer after each ATM cell, the number and contents of said ECP patterns corresponding to the desired time delay before the transmission of the next ATM cell in said buffer;

reading data from the output of said buffer; and transmitting each ATM cell emerging from said buffer towards its destination after a delay time period that is determined by the number and contents of the ECP patterns preceding that ATM cell.

2. The method for regulating the time of transmission of ATM cells over several virtual connections operating at various data rates as set forth in claim 1, wherein said sequentially-accessible buffer used for storing the ATM cells and ECP patterns is a first-in-first-out (FIFO) buffer register.

3. The method for regulating the time of transmission of ATM cells over several virtual connections operating at various data rates as set forth in claim 2, wherein:

the width of the data registers of the FIFO buffer is one word comprising n bits;

each ATM cell occupies m words within the registers of said FIFO buffer; and each ECP pattern is one word comprising n bits, said ECP pattern occupying one data register and being constructed in bit format so as to be readily distinguishable from all or any parts of the first word of an ATM cell.

4. The method for regulating the time of transmission of ATM cells over several virtual connections operating at various data rates as set forth in claim 1, wherein a buffer relating to one or more connections is kept separate from the buffer for other connections.

5. The method for regulating the time of transmission of ATM cells over several virtual connections operating at various data rates as set forth in claim 1, wherein the bits of each ECP pattern are selected in such a manner that the ECP bit pattern never matches the bit sequence of the first word of any of the ATM cells stored in said buffer.

6. The method for regulating the time of transmission of ATM cells over several virtual connections operating at various data rates as set forth in claim 1, wherein the time interval represented by an ECP pattern bears a fixed correspondence to the time interval represented by an ATM cell.

7. The method for regulating the time of transmission of ATM cells over several virtual connections operating at various data rates as set forth in claim 1, wherein the ECP pattern comprises a sequence of zeroes in the portions of the ECP pattern that correspond to the Virtual Path Identifier (VPI) and Virtual Channel Identifier (VCI) fields of an ATM cell header.

8. The method for regulating the time of transmission of ATM cells over several virtual connections operating at various data rates as set forth in claim 1, wherein the ECP pattern comprises a pure sequence of zeroes.

9. The method for regulating the time of transmission of ATM cells over several virtual connections operating at various data rates as set forth in claim 1, which includes the additional steps of:

generating a full signal when said buffer has empty register space corresponding to less than one ATM cell; and terminating said step of generating an extended ATM cell in response to the generation of said full signal.

10. The method for regulating the time of transmission of ATM cells over several virtual connections operating at various data rates as set forth in claim 9, wherein said step of generating a full signal further includes counting the current number of ATM cells and counting the current number of ECP patterns within the register of said buffer.

11. The method for regulating the time of transmission of ATM cells over several virtual connections operating at various data rates as set forth in claim 1, which includes the additional step of identifying the beginning of a new ATM cell within the registers of said buffer in response to the detection of the end of an ECP pattern within said buffer.

12. In an Asynchronous Transfer Mode (ATM) telecommunications network, a system for regulating the time of transmission of ATM cells over several virtual connections operating at various data rates, said system comprising:

means for generating an extended ATM cell by relating each ATM cell to be transmitted to a timing tag, each ATM cell having a data portion and a header portion, said timing tag being indicative of the time at which the ATM cell is to be transmitted relative to the time of transmission of the immediately preceding ATM cell;

means for storing each ATM cell in a sequentially-accessible buffer;

means for generating an empty cell position (ECP) pattern containing information indicative of a user-selectable delay time for the transmission of the next ATM cell;

means for storing zero or more ECP patterns in said buffer after each ATM cell, the number and contents of said ECP patterns corresponding to the desired time delay before the transmission of the next ATM cell in said buffer;

means for reading data from the output of said buffer; and means for transmitting each ATM cell emerging from said buffer towards its destination after a delay time period that is determined by the number and contents of the ECP patterns preceding that ATM cell.

13. The system for regulating the time of transmission of ATM cells over several virtual connections operating at various data rates as set forth in claim 12, wherein said sequentially-accessible buffer used for storing the ATM cells and ECP patterns is a first-in-first-out (FIFO) buffer register.

14. The system for regulating the time of transmission of ATM cells over several virtual connections operating at various data rates as set forth in claim 13, wherein:

the width of the data registers of the FIFO buffer is one word comprising n bits;

each ATM cell occupies m words within the registers of said FIFO buffer; and each ECP pattern is one word comprising n bits, said ECP pattern occupying one data register and being constructed in bit format so as to be readily distinguishable from all or any parts of the first word of an ATM cell.

15. The system for regulating the time of transmission of ATM cells over several virtual connections operating at various data rates as set forth in claim 12, wherein a buffer relating to one or more connections is kept separate from the buffer for other connections.

16. The system for regulating the time of transmission of ATM cells over several virtual connections operating at various data rates as set forth in claim 12, wherein the bits of each ECP pattern are selected in such a manner that the ECP bit pattern never matches the bit sequence of the first word of any of the ATM cells stored in said buffer.

17. The system for regulating the time of transmission of ATM cells over several virtual connections operating at various data rates as set forth in claim 12, wherein the time interval represented by an ECP pattern bears a fixed correspondence to the time interval represented by an ATM cell.

18. The system for regulating the time of transmission of ATM cells over several virtual connections operating at various data rates as set forth in claim 12, wherein the ECP pattern comprises a sequence of zeroes in the portions of the ECP pattern that correspond to the Virtual Path Identifier (VPI) and Virtual Channel Identifier (VCI) fields of an ATM cell header.

19. The system for regulating the time of transmission of ATM cells over several virtual connections operating an various data rates as set forth in claim 12, wherein the ECP pattern comprises a pure sequence of zeroes.

20. The system for regulating the time of transmission of ATM cells over several virtual connections operating at various data rates as set forth in claim 12, additionally including:

means for generating a full signal when said buffer has empty register space corresponding to less than one ATM cell; and means for terminating said step of generating an extended ATM cell in response to the generation of said full signal.

21. The system for regulating the time of transmission of ATM cells over several virtual connections operating at various data rates as set forth in claim 20, wherein said means for generating a full signal further includes means for counting the current number of ATM cells and means for counting the current number of ECP patterns within the register of said buffer.

22. The system for regulating the time of transmission of ATM cells over several virtual connections operating at various data rates as set forth in claim 12, additionally including means for identifying the beginning of a new ATM cell within the registers of said buffer in response to the detection of the end of an ECP pattern within said buffer.

23. In a telecommunications network, a method for regulating the transmission time and the transmission data rate of a sequence of data cells having a fixed format, said method comprising the steps of:

generating an extended data cell by relating a data cell to be transmitted with a timing tag, each data cell having a data portion and a header portion, said timing tag being indicative of the time at which the data cell is to be transmitted relative to the time of transmission of the immediately preceding data cell;

storing each data cell in a first-in-first-out (FIFO) buffer register;

generating an empty cell position (ECP) pattern containing information indicative of a user-selectable delay time for the transmission of the next data cell, the structure of said ECP pattern being distinguishably different from the first word of each of said data cells;

storing zero or more ECP patterns in said FIFO buffer after each data cell, the number and contents of said ECP patterns corresponding to the desired time delay before the transmission of the next data cell in said FIFO buffer;

reading data from the output of said FIFO buffer; and transmitting each data cell emerging from said FIFO buffer towards its destination after a delay time period that is determined by the number and contents of the ECP patterns preceding that data cell.

24. The method for regulating the transmission time and the transmission data rate of a sequence of data cells having a fixed format as set forth in claim 23, wherein:

the width of the data registers of said FIFO buffer is one word comprising n bits;

each data cell occupies m words within the registers of said FIFO buffer; and each ECP pattern is one word comprising n bits, said ECP pattern occupying one data register.

25. The method for regulating the transmission time and the transmission data rate of a sequence of data cells having a fixed format as set forth in claim 23, wherein the bit pattern of each ECP pattern is selected in such a manner that the ECP bit pattern never matches the bit sequence of the first word of any of the data cells stored in said FIFO buffer.

26. The method for regulating the transmission time and the transmission data rate of a sequence of data cells having a fixed format as set forth in claim 23, wherein the time interval represented by an ECP pattern bears a fixed correspondence to the time interval represented by a data cell.

27. The method for regulating the transmission time and the transmission data rate of a sequence of data cells having a fixed format as set forth in claim 23, wherein the ECP pattern comprises a pure sequence of zeroes.

28. The method for regulating the transmission time and the transmission data rate of a sequence of data cells having a fixed format as set forth in claim 23, which includes the additional steps of:

generating a full signal when said FIFO buffer has empty register space corresponding to less than one data cell; and terminating said step of generating an extended data cell in response to the generation of said full signal.

29. The method for regulating the transmission time and the transmission data rate of a sequence of data cells having a fixed format as set forth in claim 28, wherein said step of generating a full signal further includes counting the current number of data cells and counting the current number of ECP patterns within the register of said FIFO buffer.

30. The method for regulating the transmission time and the transmission data rate of a sequence of data cells having a fixed format as set forth in claim 23, which includes the additional step of identifying the beginning of a new data cell within the registers of said FIFO buffer in response to the detection of the end of an ECP pattern within said FIFO buffer.

31. In a telecommunications network, a system for regulating the transmission time and the transmission data rate of a sequence of data cells having a fixed format, said system comprising:

means for generating an extended data cell by relating a data cell to be transmitted to a timing tag, each data cell having a data portion and a header portion, said timing tag being indicative of the time at which the data cell is to be transmitted relative to the time of transmission of the immediately preceding data cell;

means for storing each data cell in a first-in-first-out (FIFO) buffer register;

means for generating an empty cell position (ECP) pattern containing information indicative of a user-selectable delay time for the transmission of the next data cell, the structure of said ECP pattern being distinguishably different from the first word of each of said data cells;

means for storing zero or more ECP patterns in said FIFO buffer after each data cell, the number and contents of said ECP patterns corresponding to the desired time delay before the transmission of the next data cell in said FIFO buffer;

means for reading data from the output of said FIFO buffer; and means for transmitting each data cell emerging from said FIFO buffer towards its destination after a delay time period that is determined by the number and contents of the ECP patterns preceding that data cell.

32. The system for regulating the transmission time and the transmission data rate of a sequence of data cells having a fixed format as set forth in claim 31, wherein:

the width of the data registers of said FIFO buffer is one word comprising n bits;

each data cell occupies m words within the registers of said FIFO buffer; and each ECP pattern is one word comprising n bits, said ECP pattern occupying one data register.

33. The system for regulating the transmission time and the transmission data rate of a sequence of data cells having a fixed format as set forth in claim 31, wherein the bit pattern of each ECP pattern is selected in such a manner that the ECP bit pattern never matches the bit sequence of the first word of any of the data cells stored in said FIFO buffer.

34. The system for regulating the transmission time and the transmission data rate of a sequence of data cells having a fixed format as set forth in claim 31, wherein the time interval represented by an ECP pattern bears a fixed correspondence to the time interval represented by a data cell.

35. The system for regulating the transmission time and the transmission data rate of a sequence of data cells having a fixed format as set forth in claim 31, wherein the ECP pattern comprises a pure sequence of zeroes.

36. The system for regulating the transmission time and the transmission data rate of a sequence of data cells having a fixed format as set forth in claim 31, which additionally includes:

means for generating a full signal when said FIFO buffer has empty register space corresponding to less than one data cell; and means for terminating said step of generating an extended data cell in response to the generation of said full signal.

37. The system for regulating the transmission time and the transmission data rate of a sequence of data cells having a fixed format as set forth in claim 36, wherein said means for generating a full signal further includes means for counting the current number of data cells and means for counting the current number of ECP patterns within the register of said FIFO buffer.

38. The system for regulating the transmission time and the transmission data rate of a sequence of data cells having a fixed format as set forth in claim 31, which additionally includes means for identifying the beginning of a new data cell within the registers of said FIFO buffer in response to the detection of the end of an ECP pattern within said FIFO buffer.

* * * * *